(No Model.)
E. R. PROCTER.
CAR WHEEL.
No. 347,735. Patented Aug. 17, 1886.
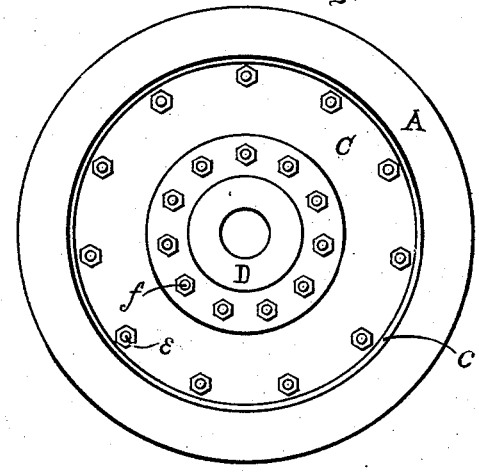
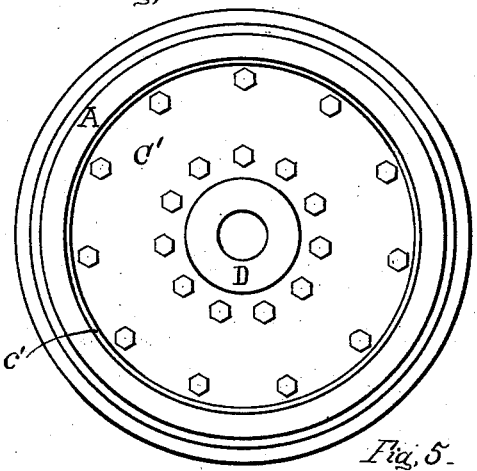
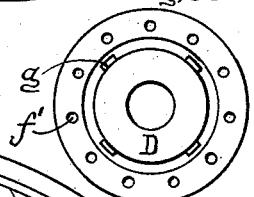
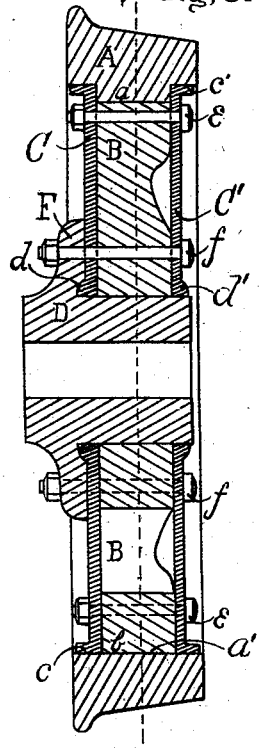
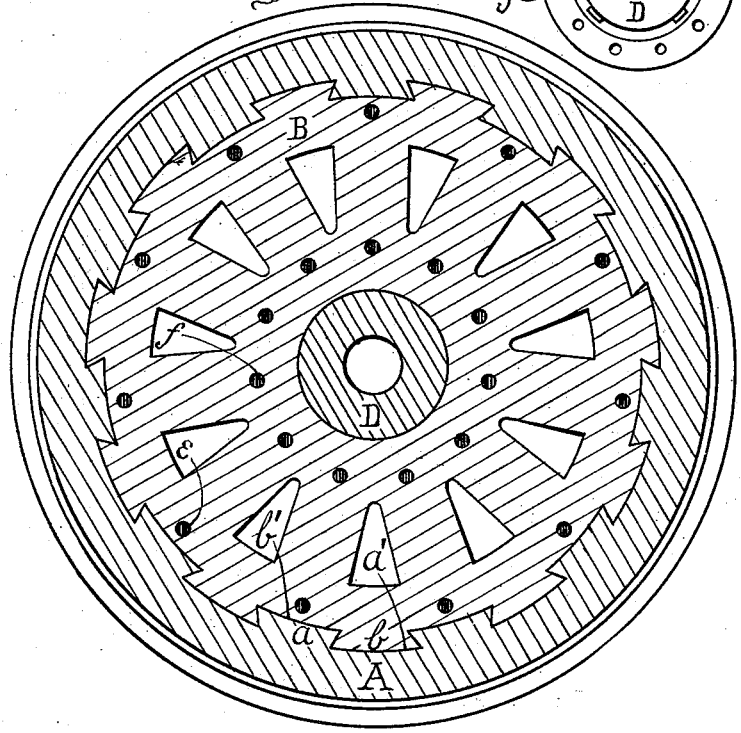
Attest
Wm. P. Jones.
K. B. Procter.
Inventor
Edwin R. Procter.

UNITED STATES PATENT OFFICE.

EDWIN R. PROCTER, OF WASHINGTON COURT-HOUSE, OHIO.

CAR-WHEEL.

SPECIFICATION forming part of Letters Patent No. 347,735, dated August 17, 1886.

Application filed March 15, 1886. Serial No. 195,343. (No model.)

*To all whom it may concern:*

Be it known that I, EDWIN R. PROCTER, of Washington Court-House, Ohio, have invented a new and useful Improvement in Railway-Car Wheels, of which the following is a specification.

My invention relates to that class of car-wheels whose tires and hubs and intermediate body portions are made apart and afterward joined together.

The objects of my invention are, first, to provide means in a tire, (without using bolt-holes,) consisting of considerable inward projections in combination with a counterpart device in the metallic core, for fastening the tire to the said core, (and thus to the wheel proper,) so that it will not leave the latter, even though it may be broken in several places, and great centrifugal power may be acting at the same moment upon the broken pieces; second, to so arrange the joining of a tire to the metallic core or body that the joint itself receives the wrenching strain, (caused by slipping wheels, sliding, starting, &c.,) instead of the fastening-bolts receiving it, as they do in many devices now in use, the functions of the said bolts being therefore, in the present device, primarily those of fastening-bolts, (in a lateral direction,) the peculiar joining of tire and core keying the tire from turning on the core.

In the accompanying drawings, Figure 1 represents the inside of wheel, (viz., side next to the center of railroad-track.) Fig. 2 represents the outside of same. Fig. 3 is a sectional view of wheel, showing construction of parts. Fig. 4 is a sectional view of wheel on line X Y, showing the plan of joint between tire and core. Fig. 5 is a view of hub, showing front or end of core of same.

A represents a metallic car-wheel tire having an inwardly-projecting flange broken at intervals by the cross-furrows $a'$ into the projections $a$, said projections being rectangular in cross-section and trapezoidal (or dovetail-shaped) in plan, the cross-furrows $a'$ being also rectangular in cross-section and trapezoidal in plan.

B represents a metallic wheel-core having its periphery corresponding in thickness with the tire-projections $a$, and divided by the cross-furrows $b'$, which are rectangular in cross-section and trapezoidal in plan, into the peripheral projections $b$, rectangular in cross-section and trapezoidal (or dovetail-shaped) in plan, the said dovetail-shaped portions $b'$ and $b$ being the exact counterparts of the dovetail-shaped furrows $a'$ and projections $a$ of tire.

C represents the inside metallic retaining-plate, and C' the outside (in and out having reference to location as to center of railroad-track) metallic retaining-plate, the two embracing between them the wheel-core B and the sides of the projections $a$ of tire, by which instrumentality the tire and core are, with the aid of the series $e$ of fastening-bolts, held secure against lateral movement as to each other.

$c$ and $c'$ represent flanges turned out at the outer edges of the circular plates C and C', respectively.

D represents a metallic hub, which has rising from one end—inner end as to railroad-track center—an outwardly-projecting flange, F, which latter has a series of bolt-holes, $f'$, to receive the series, $f$, of bolts that fasten the hub to the body portions—to wit, C, B, and C'.

$g$ represents a series of integral lugs or ribs located in the angle of flange F and periphery of core of hub, and designed to engage into counterpart depressions in the adjoining faces of both the plate C and the core B, so as to key the parts together. The plates C and C' and the wheel-core B are perforated where shown to receive the two series of fastening-bolts $e$ and $f$.

$d$ and $d'$ represent flanges turned out at the inner (or hub) edges of the circular plates C and C', respectively.

In putting the various parts together, the peripheral projections $b$ of wheel-core are forced laterally into the cross-furrows $a'$ of tire, thus simultaneously forcing the projections $a$ of tire into the oppositely-located cross-furrows $b'$ of said core until the sides of projections $b$ are flush with the sides of projections $a$—to wit, in the same plane; then the plates C and C' are placed against the sides of the interlocked core and tire-projections $a$, completely covering both of same on both sides, whereupon the series of fastening-bolts $e$ are inserted and secured by the screw-nuts, thus retaining the tire and core to each other and preventing lateral movement in either direction. The core of hub D is then forced into the hole in the center of the composite wheel-body C B C', with the series of holes $f'$ registering with a series of bolt-holes in said body, whereupon the series of fastening-bolts $f$ are inserted and secured by screw-nuts, as shown, thus completing the fastening together of the wheel.

It is obvious, from the fact that the projections $a$ of tire are wider in one direction in those parts nearest to the center of wheel than they are in those parts nearest the tread of same, and that they are inserted laterally and are held fast in counterpart depressions in the core B—to wit, depressions whose orifices in the centrifugal (farthest from center) direction are narrower than elsewhere—that the departure of sections of broken tire (unless very small) in the centrifugal direction would be prevented, the said orifices being too small for egress of the wider parts of projections $a$ within them. The low projection and the breadth of the parts $a$ and $b$ preclude the idea of their breaking off at their narrowest parts. The flanges $c$ and $c'$ of plates C and C', respectively, fitted snugly into or within the tire, as shown, add to the already broad bearing surface afforded by periphery of core B, to support the radial pressure which bears upon the parts C, B, and C' intermediate between the hub and tire. The flanges $d$ and $d'$ at the hub edges of said plates C and C', respectively, add to the bearing-surface of the intermediate body upon the hub, and increase and strengthen the metal of the retaining-plates where the latter are subject to a slight wear in service. The said flanges $c$ and $c'$ and the said flanges $d$ and $d'$ may be omitted from the plates C and C', respectively, when so desired, whereupon the said plates will have plain edges—to wit, of the same width at the edges as the plates are thick elsewhere.

I am aware that car-wheels having side plates of metal secured to the tire and hub by bolting or otherwise, and having cores of metal or other substances likewise secured to the tire and hub by bolting or otherwise, are old, and I do not claim, broadly, a car-wheel composed of such five principal parts, my invention resting mainly upon the peculiar and efficient method of interlocking the tire to the core, and thus to the wheel proper, by which construction I attain the desired objects cited previously.

What I claim as new and useful and of my invention is—

1. A car-wheel having a hub, a tire, an intermediate metallic body portion composed of a metallic wheel-core and two retaining-plates, one on each side of said core, said tire and metallic core being joined together by dovetailing the periphery of said core with the counterpart dovetailed internal flange of tire, the interlocking joints of said flange and said core being covered by the two metallic retaining-plates fastened to the said core by a series of bolts passing through them and core next inside of the flange of tire, the said metallic core, retaining-plates, and hub being united by a series of bolts passing through them, substantially as set forth.

2. A car-wheel composed of a tire, A, having the internal flange, $a$, broken at intervals by the cross-furrows $a'$, the metallic wheel-core B, having the peripheral projections $b$, the retaining-plates C and C', the hub D, having the flange F, the whole fastened together by the two series of bolts $e$ and $f$, substantially as and for the purpose described.

3. A car-wheel composed of a tire having an inwardly-projecting flange of regularly-broken outline, and a hub having a flange projecting outward from one end, united by two series of fastening-bolts to an intermediate body composed of three parts—to wit, a metallic core interposed between two retaining-plates, the flange of the tire and the periphery of the said core corresponding in thickness and lying in the same plane, the said core being peripherally connected by dovetailing to the said flange of tire, which is dovetailed to correspond, substantially as and for the purpose set forth.

4. A car-wheel composed of a tire, A, having the internal flange-projections, $a$, the metallic wheel-core B, having the peripheral projections $b$, the retaining-plates C and C', having the flanges $c$ and $d$ and flanges $c'$ and $d'$, respectively, the hub D, having the flange F, the whole fastened together by the two series of bolts $e$ and $f$, substantially as and for the purpose described.

EDWIN R. PROCTER.

Attest:
WM. P. JONES,
K. B. PROCTER.